(12) United States Patent
Stewart, II et al.

(10) Patent No.: US 7,440,699 B1
(45) Date of Patent: Oct. 21, 2008

(54) SYSTEMS, DEVICES AND METHODS FOR TRANSMITTING AND RECEIVING SIGNALS ON AN OPTICAL NETWORK

(75) Inventors: William L. Stewart, II, Benbrook, TX (US); Kyung K. Kim, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 619 days.

(21) Appl. No.: 10/878,593

(22) Filed: Jun. 28, 2004

(51) Int. Cl.
*H04B 10/00* (2006.01)
(52) U.S. Cl. .................. 398/116; 398/171; 398/135
(58) Field of Classification Search ......... 398/115–117, 398/171, 135
See application file for complete search history.

(56) References Cited

U.S. PATENT DOCUMENTS

| | | | |
|---|---|---|---|
| 3,883,217 A | 5/1975 | Love et al. | |
| 3,887,876 A | 6/1975 | Zeidler | |
| 3,936,141 A | 2/1976 | Milton | |
| 3,943,358 A | 3/1976 | Reymond et al. | |
| 4,054,366 A | 10/1977 | Barnoski et al. | |
| 4,166,946 A | 9/1979 | Chown et al. | |
| 4,234,969 A | 11/1980 | Singh | |
| 4,249,266 A | 2/1981 | Nakamori | |
| 4,301,543 A | 11/1981 | Palmer | |
| 4,307,933 A | 12/1981 | Palmer et al. | |
| 4,317,614 A | 3/1982 | Palmer | |
| 4,366,565 A | 12/1982 | Herskowitz | |
| 4,367,460 A | 1/1983 | Hodara | |
| 4,400,054 A | 8/1983 | Biard et al. | |
| 4,423,922 A | 1/1984 | Porter | |
| 4,435,849 A | 3/1984 | Ilgner et al. | |
| 4,446,515 A | 5/1984 | Sauer et al. | |
| 4,457,581 A | 7/1984 | Johnson et al. | |
| 4,482,980 A | 11/1984 | Korowitz et al. | |
| 4,506,153 A | 3/1985 | Ohno | |
| 4,543,574 A | 9/1985 | Takagi et al. | |
| 4,545,074 A | 10/1985 | Balliet et al. | |
| 4,554,511 A | 11/1985 | Braun | |
| 4,577,184 A | 3/1986 | Hodara et al. | |

(Continued)

FOREIGN PATENT DOCUMENTS

DE 3007958 A1 3/1984

(Continued)

OTHER PUBLICATIONS

Personick, Stewart D., *Optical Fiber Transmission Systems*, 1981, pp. 1-3.

(Continued)

*Primary Examiner*—Jason Chan
*Assistant Examiner*—Nathan M Curs
(74) *Attorney, Agent, or Firm*—Kilpatrick Stockton LLP

(57) ABSTRACT

Systems, devices and methods for transmitting and receiving signals on an optical network are disclosed. In one aspect, a micro device for connecting an electronic device to an optical transmission system is disclosed. The micro device can comprise optical components for receiving optical signals and converting the optical signals to electrical signals, a phase shifter for controlling the phase of the electrical signals, and an attenuator for controlling power level of the electrical signals, wherein the micro device is of a size having low electromagnetic interference susceptibility and emissivity.

12 Claims, 5 Drawing Sheets

U.S. PATENT DOCUMENTS

| | | |
|---|---|---|
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |
| 4,705,350 A | 11/1987 | Cheng |
| 4,715,012 A | 12/1987 | Mueller, Jr. |
| 4,717,229 A | 1/1988 | Cutler |
| 4,725,844 A | 2/1988 | Goodwin et al. |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,885,589 A * | 12/1989 | Edward et al. ............... 342/175 |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 4,959,837 A | 9/1990 | Febrier et al. |
| 5,029,306 A | 7/1991 | Bull et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,189,541 A | 2/1993 | Konishi |
| 5,212,577 A | 5/1993 | Nakamura et al. |
| 5,222,166 A | 6/1993 | Weltha |
| 5,267,071 A | 11/1993 | Little et al. |
| 5,283,687 A | 2/1994 | Hsu et al. |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,319,642 A | 6/1994 | Ota |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,374,935 A | 12/1994 | Forrest |
| 5,392,154 A | 2/1995 | Lin et al. |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,434,861 A | 7/1995 | Pritty et al. |
| 5,471,342 A | 11/1995 | Junginger et al. |
| 5,479,082 A | 12/1995 | Calvani et al. |
| 5,481,478 A | 1/1996 | Palmieri et al. |
| 5,483,233 A | 1/1996 | Pettitt et al. |
| 5,500,857 A | 3/1996 | Nakata |
| 5,500,867 A | 3/1996 | Krasulick |
| 5,502,589 A | 3/1996 | Yamamoto et al. |
| 5,506,709 A | 4/1996 | Segal et al. |
| 5,508,689 A | 4/1996 | Rado et al. |
| 5,517,622 A | 5/1996 | Ivanoff et al. |
| 5,528,408 A | 6/1996 | McGinley |
| 5,533,153 A | 7/1996 | Ota |
| 5,539,558 A | 7/1996 | Yonemura et al. |
| 5,541,957 A | 7/1996 | Lau |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,623,169 A | 4/1997 | Sugimoto et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A | 2/1998 | Sharma et al. |
| 5,732,086 A | 3/1998 | Liang et al. |
| 5,739,938 A * | 4/1998 | Goutzoulis et al. .......... 398/197 |
| 5,745,479 A | 4/1998 | Burns et al. |
| 5,764,821 A | 6/1998 | Glance |
| 5,777,561 A | 7/1998 | Chieu et al. |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,866,898 A | 2/1999 | Hodgson et al. |
| 5,880,863 A | 3/1999 | Rideout et al. |
| 5,894,362 A | 4/1999 | Onaka et al. |
| 5,896,417 A | 4/1999 | Lau |
| 5,898,673 A | 4/1999 | Riggan et al. |
| 5,898,801 A | 4/1999 | Braun et al. |
| 5,901,260 A | 5/1999 | Braun et al. |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,959,412 A | 9/1999 | Ushijimi |
| 5,977,911 A | 11/1999 | Green et al. |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,084,233 A | 7/2000 | Hodgson et al. |
| 6,111,888 A | 8/2000 | Green et al. |
| 6,122,095 A | 9/2000 | Fatchi |
| 6,128,111 A | 10/2000 | Roberts |
| 6,140,920 A | 10/2000 | Roberts |
| 6,157,725 A | 12/2000 | Becker |
| 6,175,533 B1 | 1/2001 | Lee et al. |
| 6,252,557 B1 | 6/2001 | Plugge et al. |
| 6,345,137 B1 | 2/2002 | Imajo |
| 6,385,366 B1 | 5/2002 | Lin |
| 6,426,815 B1 | 7/2002 | Koehler |
| 6,449,072 B1 | 9/2002 | Sian et al. |
| 6,499,027 B1 | 12/2002 | Weinberger |
| 6,502,131 B1 | 12/2002 | Vaid et al. |
| 6,567,197 B1 | 5/2003 | Glance |
| 6,782,422 B1 | 8/2004 | Bahl et al. |
| 6,784,837 B2 * | 8/2004 | Revankar et al. ............ 342/372 |
| 6,830,221 B1 * | 12/2004 | Janson et al. ............ 244/158.1 |
| 6,912,339 B2 | 6/2005 | Whittaker |
| 7,133,416 B1 | 11/2006 | Chamdani et al. |
| 2002/0018260 A1 | 2/2002 | Kisovec et al. |

| | | | |
|---|---|---|---|
| 2002/0032780 A1 | 3/2002 | Moore et al. | |
| 2002/0044565 A1 | 4/2002 | Park | |
| 2002/0065962 A1 | 5/2002 | Bakke et al. | |
| 2002/0067893 A1 | 6/2002 | Uken | |
| 2002/0083169 A1 | 6/2002 | Aki et al. | |
| 2002/0101638 A1 | 8/2002 | Xiao et al. | |
| 2002/0101874 A1 | 8/2002 | Whittaker et al. | |
| 2003/0025967 A1 | 2/2003 | Tai | |
| 2003/0170196 A1 | 9/2003 | Hall et al. | |
| 2003/0204789 A1 | 10/2003 | Peebles et al. | |
| 2003/0206134 A1* | 11/2003 | Lier et al. | 342/368 |
| 2004/0043795 A1* | 3/2004 | Zancewicz | 455/562.1 |
| 2004/0076429 A1 | 4/2004 | Meroth et al. | |
| 2004/0076434 A1 | 4/2004 | Whittaker et al. | |
| 2005/0213973 A1 | 9/2005 | Rohrer et al. | |

FOREIGN PATENT DOCUMENTS

| | | |
|---|---|---|
| DE | 3807072 A1 | 8/1988 |
| DE | 3938856 A1 | 11/1989 |
| DE | 41 02 459 A1 | 7/1992 |
| DE | 4331330 A1 | 9/1993 |
| DE | 42 26 838 A1 | 2/1994 |
| DE | 4226838 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 211 221 A1 | 2/1987 |
| EP | 0 231 635 A2 | 8/1987 |
| EP | 0 356 090 A2 | 2/1990 |
| EP | 0 380 341 A2 | 8/1990 |
| EP | 0 393 293 | 10/1990 |
| EP | 0 414 333 | 2/1991 |
| EP | 0 905 936 A2 | 3/1991 |
| EP | 0 451 426 | 10/1991 |
| EP | 0 503 212 | 9/1992 |
| EP | 0 528 636 A1 | 2/1993 |
| EP | 0 739 103 A2 | 10/1996 |
| EP | 0 744 797 A1 | 11/1996 |
| EP | 0 899 161 A1 | 3/1999 |
| EP | 0 350 720 | 1/2001 |
| EP | 1 246 378 A2 | 10/2002 |
| EP | 1 260 840 A2 | 11/2002 |
| FR | 2574565 | 6/1986 |
| GB | 2073877 | 10/1981 |
| GB | 2087679 | 5/1982 |
| GB | 2102232 | 1/1983 |
| GB | 2 118 319 A1 | 10/1983 |
| GB | 2189961 | 11/1987 |
| GB | 2255683 | 11/1992 |
| JP | 11-87823 | 7/1989 |
| JP | 7-202921 | 8/1995 |
| JP | 9/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

H. Hodara, and E. Miles, "High-Speed Local Area Networks", *Fiber and Integrated Optics*; (1992) pp. 253-277.

N.A. Olsson, Lightwave Systems With Optical Amplifiers, *Journal of Lightwave Technology*, Jul. 1989, pp. 1071-1082.

ITU-T Recommendation G.681, Series G: Transmission Systems and Media, Digital Systems and Networks; Functional characteristics of interoffice and long-haul systems using optical amplifiers, including optical multiplexing (Oct. 1996).

ITU-T Recommendation G.692, Series G: Transmission Systems and Media, Digital Systems and Networks; Optical interfaces for multichannel systems with optical amplifiers (Oct. 1998).

Fibre Channel—Overview of the Technology, Sep. 9, 2000, pp. 1-9 *available at* http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) *available at* http://ece.utexas.edu/projects/ece/mrc/profs/chen_projects/optbus/optbus.html.

SOME Bus (Simultaneous Optical Multiprocessor Exchange Bus)(Sep. 9, 2000) *available at* http://eb.uah.edu/-cohen/some_bus/some_bus.html.

Integrated Explorations of the Spectral, Temporal and Spatial Degrees of Freedom 1 (Sep. 9, 2000) *available at* http://thebusinessedge.com/reruns/cito/sargent/std001.htm.

Challenges in IP LANs on Higher-Dimensional Encoding (slide 4) (Sep. 9, 2000) *available at* http://thebusinessedge.com/reruns/cito/sargent/sid004.htm.

0034-P PCI 1-Gig Fibre Channel Optical Host Bus Adapter 1-4 *available at* http://solutions.sun.com/dbsearch/index.cgi?STATE=product&CMD=show&p_id=58181 (Sep. 9, 2000).

Architectural and Engineering Issues for Building an Optical Internet 1—55 (Sep. 9, 2000) *available at* http://www.canet3.net/papers/ArchandEngIssues.html.

Chinlon Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for data and sensors*, Optics Letter 1159-61 (Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Moile of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multi-channel visual signals using a single optical fiber and a bi-directional optical amplifier," *T.IEE Japan*, 119-C(12):1528-1534 (1999).

Kempalnen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management—Management of SONET Networks—White Paper," Clear Communications, *Sonet and Performance Management*, issue 1, Apr. 1996 (pp. 1-21).

Cisco Wavelength Router Manager—Data Sheet, www.cisco.com/warp/public/cc/so/neso/olso/cwrm_ds.htm (Apr. 25, 2001).

Gallardo, et al., "Fast Simulation of Boradband Telecommunicatios Networks Carrying Long-Range Dependent Bursty Traffic," Preceedings of the 1999 Winter Simulation Conference, pp. 374-381 (Winter 1999).

Willinger, et al., "Self-Similarity Through High-Variability: Statistical Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarariers," *Journal of Lightwave Technology*, 7(11):1825-1838 (1989).

Fibre Channel Overview http://his.web.cem.ch/HIS/fcs/spec/overview.htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

Paper authored by Stewart, William L. and James G. Blaylock, Lockheed Martin Aeronautics Company, entitled 'The Challenge of Transmitting Super-High Frequency Radio Signals Over Short-Fiber-Optic Networks on Aerospace Platforms,', pp. 1-9 (Oct. 2002).

Stewart, William L., Senior Staff Specialist, and James Blaylock, Senior Staff Specialist, Lockheed Martin Aeronautics Company, presentation entitled 'The Challenge of Transmitting Super-High Frequency Radio Signals Over Short-Fiber-Optic Networks on Aerospace Platforms,', 21st DASC : Oct. 31, 2002pp. 1-9 (Oct. 2002), 14 pages.

Al-Raweshidy, et al. Editors, 'Basic Microwave Properties of Optical Links,' *Radio over Fiber Technologies for Mobile Communications Networks*, pp. 7-16 (2002).

Keyserling, A. and R.C.L., "Chapter 2: Number, Dimensions, Mandelbrot, Chaos, 4 Attractors, Music and Color," www.chanceandchoice.com/ChanceandChoice/chapter2.html (Apr. 26, 2001), 04 pages.

Donald G. Baker, *Monomode Fiber Optic Design: With Local Area and Long-Haul Network Applications,* pp. 370-371, ISBN 0-442-21107-4, Publisher: Van Nostrand Reinhold (Aug. 1987).

Karim, *Electro-Optical Devices and Systems,* pp. 434-435, Publisher: PWS Pub. Co. (Feb. 1990).

* cited by examiner

SYSTEMS, DEVICES AND METHODS FOR TRANSMITTING AND RECEIVING SIGNALS ON AN OPTICAL NETWORK

FIELD OF THE INVENTION

The invention relates generally to an optical distribution network and, more particularly, to systems, devices and methods for transmitting and receiving signals on an optical network.

BACKGROUND

Modern vehicles, such as aircraft, have an increasing number of antennas on them. Conventional communications systems utilize a point-to-point system using coaxial cable to connect radio receivers and transmitters to antennas and can be high loss, heavy and high volume systems. Additionally such systems can emit electromagnetic interference (EMI), which can cause reduced data integrity and increased error rates on transmission signals. Conventional communications systems must utilize great care to shield those signals from sources of electromagnetic radiation.

Optical communication systems have many advantages over systems that transmit electrical signals. Optical signals are immune to electromagnetic radiation and do not require shielding during transmission. Additionally, electrical signals can be transmitted for only relatively small distances because electrical signals incur losses proportional to the distance. Radio frequency signal losses increase rapidly as frequency increases. Optical signals, on the other hand, can be transmitted for great distances with little or no loss. Further, optical systems can reduce the amount of wiring required and can reduce the weight of the communication system. For these and other reasons, many communication systems incorporate optical signals and utilize optical networks.

Wavelength division multiplexing (WDM) can be used in optical networks to transmit many signals simultaneously over a single fiber by encoding them in different wavelengths or channels. An optical network can be bi-directional and permit a plurality of different network topologies. Optical bus interface modules can be used with the optical network that operate as a passive fiber optic coupler, which can be combined with WDM to selectively route optical signals in and out of the optical network at each node.

Conventional optical communication systems can be limited in transmitting radio frequency (RF) signals and other analog signals encoded with a high degree of information. Conventional optical communication systems are typically low power systems and the transmission of RF signals through an electronic device, such as an antenna, can require high power. Thus, conventional optical connections to an antenna have typically required a power amplifier at the antenna location on the vehicle, such as an aircraft. This can causes problems due to the heat generated by the power amplifier near the exterior of the aircraft.

SUMMARY

The invention addresses the problems above by providing systems, methods, and devices for transmitting and receiving signals on an optical network. In one embodiment, a micro device for connecting an electronic device to an optical transmission system is disclosed. The micro device can comprise optical components for receiving optical signals and converting the optical signals to electrical signals, a phase shifter for controlling the phase of the electrical signals, and an attenuator for controlling power level of the electrical signals, wherein the micro device is of a size having low electromagnetic interference susceptibility and emissivity. The electronic device can be an RF antenna and the micro device can also comprise optical components capable of receiving RF electrical signals from the RF antenna and converting the RF electrical signals to optical signals, a limiter for receiving RF electrical signals from the RF antenna, and transmit/receive switches for switching the micro device between a transmit mode and a receive mode These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

Figure 1:
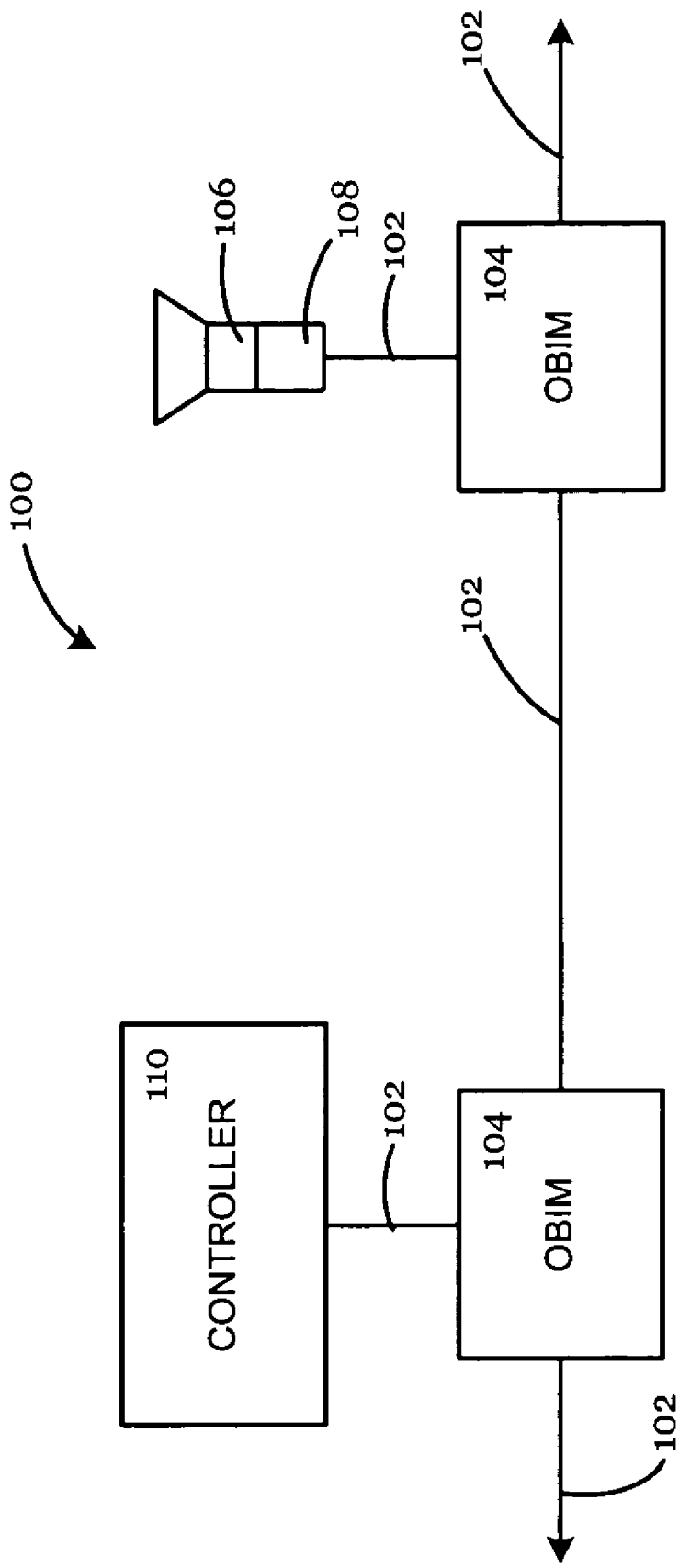
FIG. 1 is a diagram illustrating a portion of an exemplary optical network according to one embodiment of the present invention.

Referring now to the drawings in which like numerals indicate like elements throughout the several figures, FIG. 1 is a diagram illustrating a portion of an exemplary optical communication system or network 100 according to one embodiment of the present invention. The optical communication network 100 can utilize WDM and can be a bi-directional optical transport system that permits a plurality of different network topologies. U.S. Pat. No. 5,898,801, which is hereby incorporated in its entirety by this reference, discloses such a system. The optical network 100 can be designed to permit communication to and from electronic devices, such as electronic circuits and antennas. In one embodiment, an array of low power antennas is utilized. The optical network 100 includes an optical bus 102 and a series of optical bus interface modules (OBIMs) 104 coupled to the optical bus 102. Each OBIM is capable of inserting, extracting, and transmitting light bi-directionally over one, two or a plurality of fiber optic transmission lines carrying one, two or a plurality of analog, digital, or discrete signals that are encoded using one, two, or a plurality of encoding techniques. The OBIMs 104 used with the optical network 100 can be configured like the OBIMs disclosed in U.S. Pat. No. 5,901,260, which is hereby incorporated in its entirety by this reference.

Each electronic device 106, such as an electronic circuit or antenna is connected to a micro photonics interface module 108, shown in FIG. 1, for example, as a micro RF photonics interface module. The RF photonics interface module 108 is coupled to the optical bus 102 via an OBIM 104. The optical network 100 also includes a controller 110 for controlling the electronic devices 106 and processing the signals received by the electronic devices 106. In an embodiment where an array of antennas is utilized, the individual antennas 106 can be controlled by the controller 110 to form desired beam patterns and to steer the beam patterns. The beam patterns can be steered by controlling the phase of the signals applied to each of the antennas 106. By introducing phase delays in the signals applied to the different antennas 106, the beams formed by the antenna array can be selectively steered in a given direction.

The micro RF photonics interface module 108 can convert an RF electrical signal to an optical signal or an optical signal to an RF electrical signal. The interface module 108 is of a size small enough that is has low electromagnetic interference susceptibility and emissivity. For example, the interface module 108 can comprise electronic components sized on the order of microns. In one embodiment, the interface module 108 is a one-millimeter by one-millimeter by three-millimeters module and is suitable for mounting in a miniature RF antenna connector or in the skin or structure of a vehicle or other apparatus or structure. The interface module 108 can have electronics leads to conduct electronics signals and fiber optics leads to conduct optical signals and receive photonics power. In one embodiment, the fiber optics leads are suitable for single mode wavelength division multiplex (WDM) signal transmission and for photonics power. In one embodiment, the single mode signal is transmitted at one or more wavelengths in the 1550 nanometer band and the (multimode) photonics power is transmitted in the 850 nanometer band. The photonics power can be generated by an off board laser and provided to the interface module 108 for conversion to electronics power. The interface module can be configured as a receiver module, as a transmission module, or as a transceiver module that is switchable to transmit or receive.

In an alternative embodiment (not shown), an antenna can connect to a micro RF photonics interface module and the interface module can connect to an electro-optical interface via optical fiber. The electro-optical interface can connect to the controller.

Figure 2:
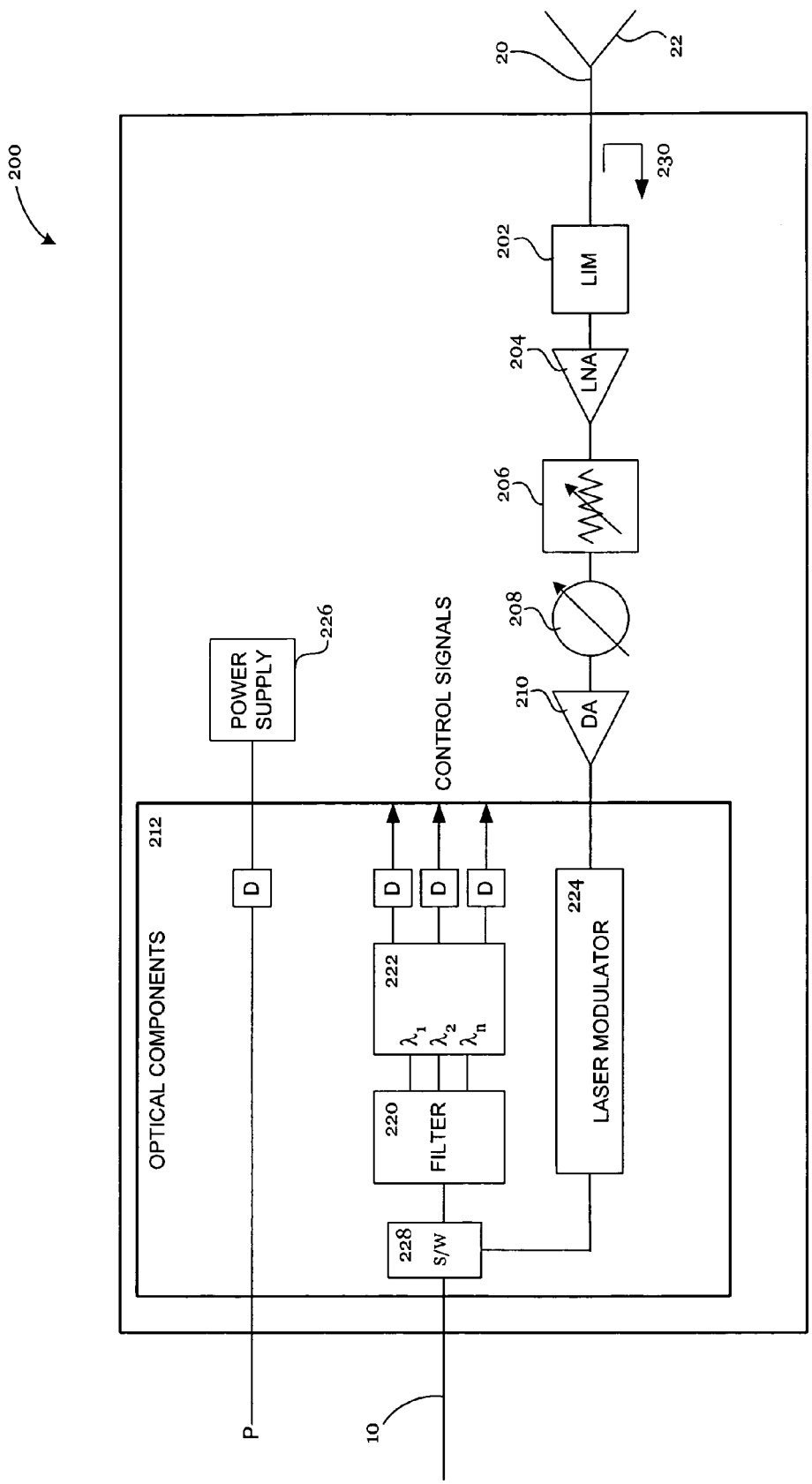
FIG. 2 is a diagram illustrating an exemplary micro receiver interface module according to one embodiment of the present invention.

FIG. 2 is a diagram illustrating an exemplary micro receiver interface module 200, such as an RF receiver module, according to one embodiment of the present invention. The RF receiver module 200 receives an electrical signal 20, such as an RF electrical signal, via an electronic device, such as an antenna element 22, and outputs a photonics output signal 10. The received RF electrical signal 20 is received by the RF receiver module 200 in a limiter 202. The limiter 202 can control unexpectedly strong signals and reduce such signals in order to protect the electronics in the RF receiver module 200. The RF electrical signal next can be received by a low noise amplifier 204 where the RF electrical signal is amplified to distinguish it from noise received along with the RF electrical signal. The RF electrical signal can next pass through an attenuator 206. The attenuator 206 allows for the weighting of the RF electrical signal, if necessary. The RF electrical signal can next pass through a phase shifter 208. The phase shifter 208 allows for the control of the phase. The RF electrical signal next passes through drive amplifier 210.

The drive amplifier 210 boosts the RF electrical signal to make up for the losses in the RF electrical signal due to the phase shifter 208 and the attenuator 206 or expected or potential losses in a laser modulator. The RF electrical signal is then received by a laser modulator 224 in the optical components 212 where it is converted from a RF electrical signal to a photonic output signal 10 and sent to an optical switch 228. The optical switch in transmit mode outputs the photonic signal on an optical fiber cable.

Wave Division Multiplexing (WDM) control signals can also be received by the optical components 212 of the module 200. The WDM signals can be received on the same fiber optic cable as the photonic output signals or can be received from a different cable. In one embodiment, the WDM signals are received by the optical switch 228, which in receive mode passes the signals to a filter 220. The filter 220 can filter the photonics signals into separate signals based on wavelength. For example, signals on wavelengths $\lambda_1$ to $\lambda_N$ can be separated into distinct signals and can each be converted to electric signals by a photonics detector D, such as a photo diode. The optical components 212 can also contain additional components to convert electrical signals to photonic signals, such as a laser and an optical modulator.

The signals on wavelengths $\lambda_1$ to $\lambda_N$ can be control signals used to control various aspects of the operation of the module 200. The signals on wavelengths $\lambda_1$ to $\lambda_N$ can also be Health Monitoring (HM) signals such as, for example, Built-In Test (BIT), Optical Time Domain Reflectometer (OTDR), and blanking signals from other modules, that can be used to verify that the module is operating appropriately and that all components within the module are operating appropriately. The HM signals can be used with a coupler 230 to send and receive test signals through the module 200 and various components of the module 200. While FIG. 2 illustrates one coupler 230 at the input of module 200, one skilled in the art would understand that the module 200 can have many couplers located throughout the module 200 to identify and isolate any problems with the components of the module 200 or input signals to the module 200. One skilled in the art would also understand that the HM signals can be simple or complex signals.

Photonics power for the module 200 can be supplied by input photonics signals on the same cable as the photonics output signal or, alternatively, the photonics power can be supplied by a separate cable. The photonics power signal P can be converted to an electrical signal by a photonics detector D and transmitted to a power supply 226. The power supply 226 can power the module 200. In an alternative embodiment, the power supply can receive an electrical power signal, such as an AC power signal. In one embodiment, the electrical power signal can result from harvested energy, such as vibration or temperature harvested energy.

Figure 3:
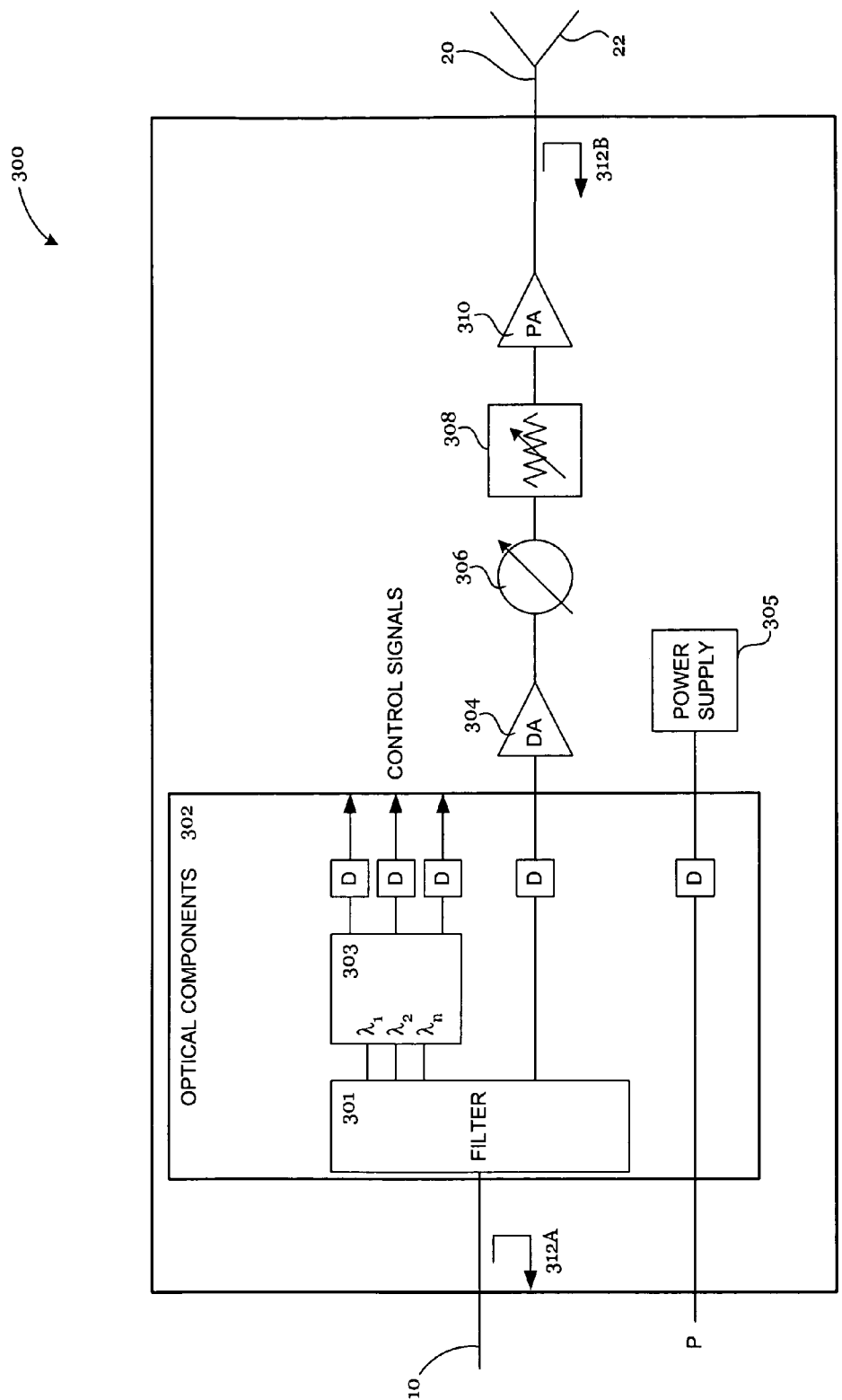
FIG. 3 is a diagram illustrating an exemplary micro transmission interface module according to one embodiment of the present invention.

FIG. 3 is a diagram illustrating an exemplary micro transmission interface module 300, such as an RF transmission module according to one embodiment of the present invention. The transmission module 300 receives an input photonics signal 10 and transmits a electrical signal 20, such as an RF electrical signal, to an electronic device, as shown in FIG. 3, an antenna element 22. The photonics signal 10 can comprise multiple WDM signals, including the transmission signal and control signals. The WDM signals are received by a filter 301 in the optical components 302 of the module 300. The filter 301 can filter the photonics signals into separate signals based on wavelength. For example, signals on wavelengths $\lambda_1$ to $\lambda_N$ are separated from the transmission signal. All of the input signals, including the transmission signal, can be converted to electrical signals by a photonics detector D, such as a photo diode. The optical components 302 can also contain additional components to convert an electrical signal to a photonic signal, such as a laser and an optical modulator.

The signals on wavelengths $\lambda_1$ to $\lambda_N$ can be control signals used to control various aspects of the operation of the module 300. The signals on wavelengths $\lambda_1$ to $\lambda_N$ can also be Health Monitoring (HM) signals such as, for example, Built-In Test (BIT), Optical Time Domain Reflectometer (OTDR), and blanking signals from other modules, that can be used to verify that the module is operating appropriately and that all components within the module are operating appropriately. The HM signals can be used with couplers 312 A,B to send test and receive signals through the module 300 and various components of the module 300. While FIG. 3 illustrates two couplers 312 A,B, one skilled in the art would understand that the module 300 can have many couplers located throughout the module 300 to identify and isolate any problems with the components of the module 300 or input signals to the module 300. One skilled in the art would also understand that the HM signals can be simple or complex signals.

Photonics power for the module 300 can be supplied by input photonics signals on the same cable as the photonics output signal or, alternatively, the photonics power can be supplied by a separate cable. The photonics power signal P can be converted to an electrical signal by a photonics detector D and transmitted to a power supply 305. The power supply 305 can power the module 300. In an alternative embodiment, the power supply can receive an electrical power signal, such as an AC power signal. In one embodiment, the electrical power signal can result from harvested energy, such as vibration or temperature harvested energy.

The electrical transmission signal, such as an RF electrical signal, can be received by a drive amplifier 304. The drive amplifier 304 can be necessary due to the relatively low power converted photonic signal to bring the RF electrical signal up in power so that it can be controlled, if necessary. The amplified RF electrical signal can then be phase shifted by a phase shifter 306. The phase shifter 306 allows for control of the phase of the RF electrical signal. A variable resister/attenuator 308 can receive the RF electrical signal and can allow for the power level of the RF electrical signal to be controlled. The RF electrical signal can then be received by a power amplifier 310, which amplifies the RF electrical signal. The power amplifier 310 can be a single stage amplifier or can be a two or more stage power amplifier. The RF electrical signal is then received and broadcast by the antenna element 22.

Figure 4:
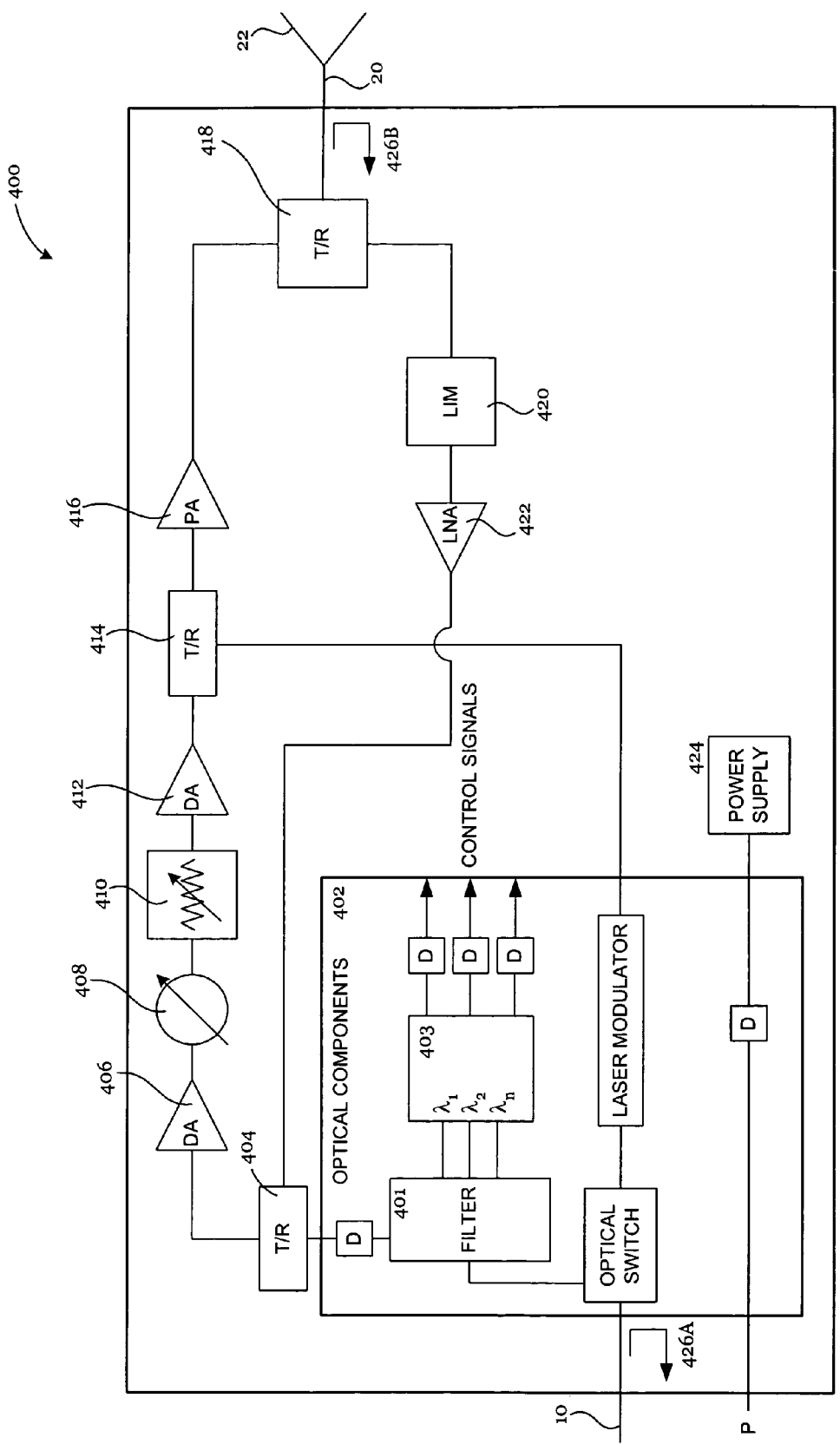
FIG. 4 is a diagram illustrating an exemplary micro transceiver interface module according to one embodiment of the present invention.

FIG. 4 is a diagram illustrating an exemplary micro transceiver interface module 400, such as an RF transceiver module, according to one embodiment of the present invention. The RF transceiver module 400 can both receive a photonic input signal 10 and transmit an electrical signal 20, such as an RF electrical signal, and can receive an electrical signal 20, such as an RF electrical signal, and transmit a photonic output signal 10. In transmit mode, the photonic signal 10 is received by optical components 402 converted into an RF electrical signal. The photonics signal 10 can comprise multiple WDM signals, including the transmission signal and control signals. The WDM signals are received by an optical switch and then sent to a filter 401. The filter 401 can filter the photonics signals into separate signals based on wavelength. For example, signals on wavelengths $\lambda_1$ to $\lambda_N$ are separated from the transmission signal. All of the input signals, including the transmission signal, can be converted to electrical signals by a photonics detector D, such as a photo diode.

The signals on wavelengths $\lambda_1$ to $\lambda_N$ can be control signals used to control various aspects of the operation of the module 400. The signals on wavelengths $\lambda_1$ to $\lambda_N$ can also be Health Monitoring (HM) signals such as, for example, Built-In Test (BIT), Optical Time Domain Reflectometer (OTDR), and blanking signals from other modules, that can be used to verify that the module is operating appropriately and that all components within the module are operating appropriately. The HM signals can be used with couplers 426 A,B to send test and receive signals through the module 400 and various components of the module 400. While FIG. 4 illustrates two couplers 412 A,B, one skilled in the art would understand that the module 400 can have many couplers located throughout the module 400 to identify and isolate any problems with the components of the module 400 or input signals to the module 400. One skilled in the art would also understand that the HM signals can be simple or complex signals.

The converted RF transmission electrical signal can then be sent to the transmit-receive switch 404. In transmit mode, the transmit-receive switch 404 is open and allows the RF electrical signal to pass to a drive amplifier 406. From the drive amplifier 406, the RF electrical signal can pass through a phase shifter 408, and attenuator 410. If necessary, the RF electrical signal can also pass through a second drive amplifier 412. The RF electrical signal is then received at the second transmit-receive switch 414, which in transmit mode is open and allows the RF electrical signal to pass through to a power amplifier 416 where the RF electrical signal is amplified. The RF electrical signal is then received by a third transmit-receive switch 418. In transmit mode, the third transmit-receive switch 418 is open and allows the RF electrical signal 20 to be transmitted to the antenna element 22. The antenna element 22 can then broadcast the signal.

In receive mode, the RF transceiver module 400 receives an electrical signal 20, such as an RF electrical signal, via an electronic device, such as the antenna element 22. The RF electrical signal is then received by the transmit-receive switch 418. The transmit-receive switch 418 in receive mode causes the RF electrical signal to pass through to a limiter 420 and a low noise amplifier 422. From there, the RF electrical signal goes to the transmit-receive switch 404 which in receive mode causes the RF electrical signal to pass through the drive amplifier 406, the phase shifter 408, the attenuator 410, and a second drive amplifier 412. From there, the RF electrical signal is received by the transmit-receive switch 414, which in receive mode causes the RF electrical signal to go to the optical components 402. The optical components 402 can convert the RF electrical signal to a photonic signal using a laser modulator and transmit the photonic signal 10 through the optical switch over optical fiber.

Photonics power for the module 400 can be supplied by input photonics signals on the same cable as the photonics output signal or, alternatively, the photonics power can be supplied by a separate cable. The photonics power signal P can be converted to an electrical signal by a photonics detector D and transmitted to a power supply 424. The power supply 424 can power the module 400. In an alternative embodiment, the power supply can receive an electrical power signal, such as a platform power signal. In one embodiment, the electrical power signal can result from harvested energy, such as vibration or temperature harvested energy.

Figure 5:
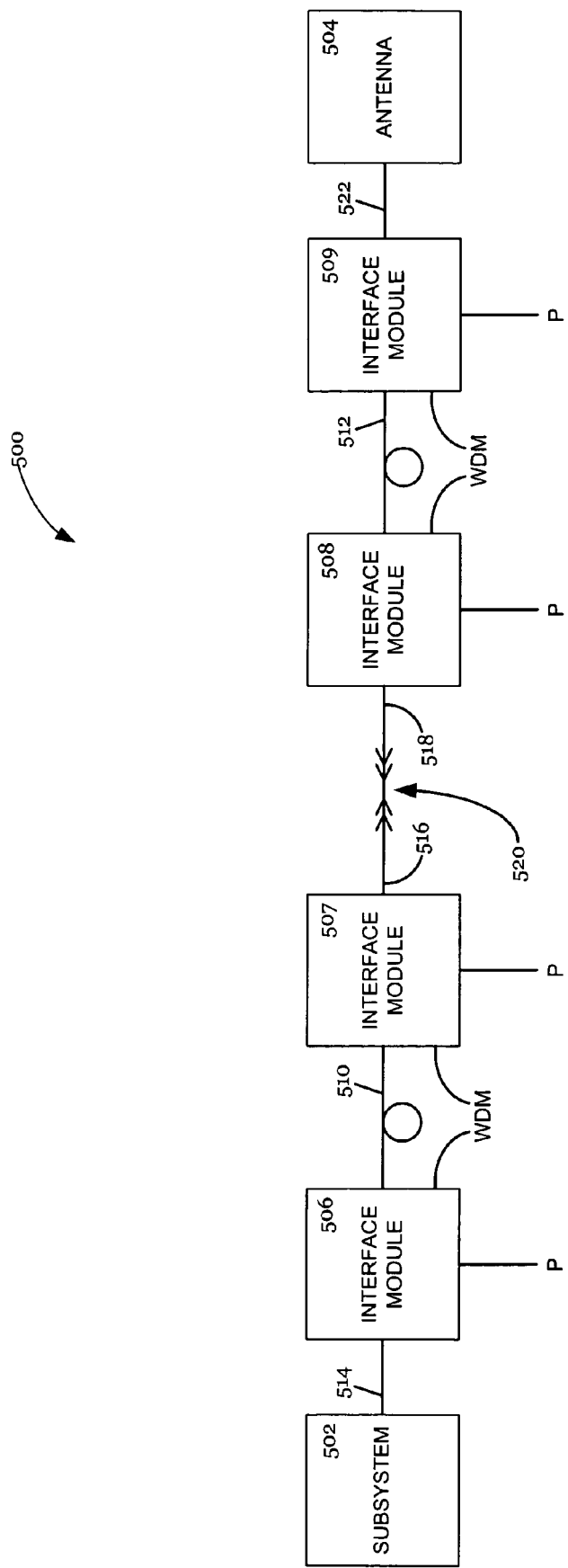
FIG. 5 is a diagram illustrating a portion of an exemplary optical network according to one embodiment of the present invention.

FIG. 5 is a diagram illustrating a portion of an exemplary optical network 500 according to another embodiment of the present invention. In this embodiment, an electrical subsystem 502, such as a radio transmit/receive subsystem, utilizes point to point connections to connect to electronic devices, 504, such as an antenna. In another embodiment, the optical network 500 can be used to connect two electrical subsystems. In the embodiment shown in FIG. 5, interface modules 506, 507, 508, 509 can be used to convert from electrical signals to photonics signals and photonics signals to electrical signals. For example, cables 510 and 512 are fiber optic cables and can carry photonics signals to and from the interface modules 506, 507, 508, 509. In one embodiment, cables 514, 516, 518, 522 are electrical pigtails and can carry electrical signals to and from the interface modules 506, 507, 508, 509. The pigtails can be connected to a pin in an RF connector or can be connected directly to an electronic circuit, which may include an antenna feed point. In one embodiment, pigtails 516 and 518 connect to a bulkhead connector pin, such as used on an aircraft. In one embodiment, the fiber optic cables 510 and 512 can have a length of several meters and the pigtails 514, 516, 518, 522 can have a length of one millimeter long.

Interface module 506, for example, can receive electrical signals from subsystem 502 via pigtail 514, convert the signals to photonic signals, and output the photonic signals to optical cable 510. Interface module can also receive photonic signals from interface module 507 via optic cable 510, convert the signals to electrical signals, and output the electrical signals to pigtail 514. The other interface modules 507, 508, 509 can operate in a similar manner. For example, the subsystem can transmit signals through the interface modules, pigtails and optic cables to antenna 504. While an antenna 504 is illustrated in FIG. 5, one skilled in the art would understand that this could be another subsystem or bulkhead.

In one embodiment, the interface modules 506, 507, 508, 509 can receive photonics power P. The photonics power can be supplied to the interface modules 506, 507, 508, 509 from the fiber optic cables 510, 512 or can be supplied by separate fiber optic cables. In another embodiment, the interface modules 506, 507, 508, 509 can receive electrical power signals, such as a platform power signal. In one embodiment, the electrical power signal can result from harvested energy, such as vibration or temperature harvested energy. In one embodiment, the interface modules can receive WDM photonics control signals. These WDM photonics control signals can be received on the fiber optic cables 510, 512 or can be received on separate fiber optic cables. In the embodiment shown in FIG. 5, the interface modules are used so that electrical coaxial cable typically used to connect electronic devices can be replaced with fiber optics cable, which can dramatically reduce the weight of the system. Moreover, the network 500 makes use of optical cables without the use of optical connectors, which are difficult to cleans and subject to damage.

The foregoing description of the preferred embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

We claim:

1. A micro device for connecting an electronic device to an optical transmission system, comprising:

optical components for receiving optical signals from the optical transmission system and converting the optical signals to electrical signals or for receiving electrical signals from the electronic device and converting the electrical signals to optical signals or both;

a phase shifter for controlling the phase of the electrical signals, the phase shifter being operably located between the optical components and the electronic device; and an attenuator for controlling power level of the electrical signals, the attenuator being operably located between the optical components and the electronic device, wherein the micro device is of a size wherein each dimension is less than 10 millimeters and wherein the optical components of the micro device receive wave division multiplexed control signals from an optical bus and health monitoring signals from one or more couplers in the micro device.

2. A micro device for connecting an electronic device to an optical transmission system, comprising:

a limiter for receiving electrical signals from the electronic device;

a phase shifter for controlling the phase of the electrical signals, the phase shifter being operably located between the optical transmission system and the electronic device;

an attenuator for controlling power level of the electrical signals, the attenuator being operably located between the optical transmission system and the electronic device; and optical components for receiving the electrical signals from the electronic device and converting the electrical signals to optical signals and transmitting the optical signals to the optical transmission system or for receiving optical signals from the optical transmission system and converting the optical signals to electrical signals or both;

wherein the optical components of the micro device receive wave division multiplexed control signals from an optical bus and health monitoring signals from one or more couplers in the micro device, and wherein the micro device is of a size wherein each dimension is less than 10 millimeters.

3. The micro device of claim 2, wherein the electronic device is an RF antenna.

4. The micro device of claim 3, wherein the micro device is mounted in an RF antenna connector.

5. The micro device of claim 2, wherein the micro device receives photonics power from a photonics power supply, wherein the photonics power at least in part powers the micro device.

6. The micro device of claim 2, further comprising a drive amplifier and a low noise amplifier each of the drive amplifier and the low noise amplifier being operably located between the optical transmission system and the electronic device.

7. The micro device of claim 2, wherein the micro device is a one millimeter by one-millimeter by three-millimeters module.

8. An optical network, comprising:

an optical bus;

a plurality of optical bus interface modules connected to the optical bus, wherein each optical bus interface module inputs optical signals on the optical bus and outputs optical signals from the optical bus;

an array of micro devices where each micro device receives RF electrical signals from an RF antenna and converts the RF electrical signals to optical signals, transmits the optical signals to the optical bus via an optical bus interface module, receives photonics power from a photonics power supply, wherein the photonics power at least in part powers the device, and receives wave division multiplexed control signals from the optical bus via an optical bus interface module, and wherein each micro device is of a size wherein each dimension is less than 10 millimeters.

9. The network of claim 8, wherein optical components of each micro device receive optical signals and convert the optical signals to RF electrical signals.

10. The network of claim 9, wherein each micro device further comprises a limiter for receiving RF electrical signals from the RF antenna and transmit/receive switches for switching the micro device between a transmit mode and a receive mode.

11. The network of claim 8, wherein each micro device is mounted in an RF antenna connector.

12. The network of claim 8, wherein each micro device is a one millimeter by one-millimeter by three-millimeters module.

* * * * *